Sept. 19, 1961

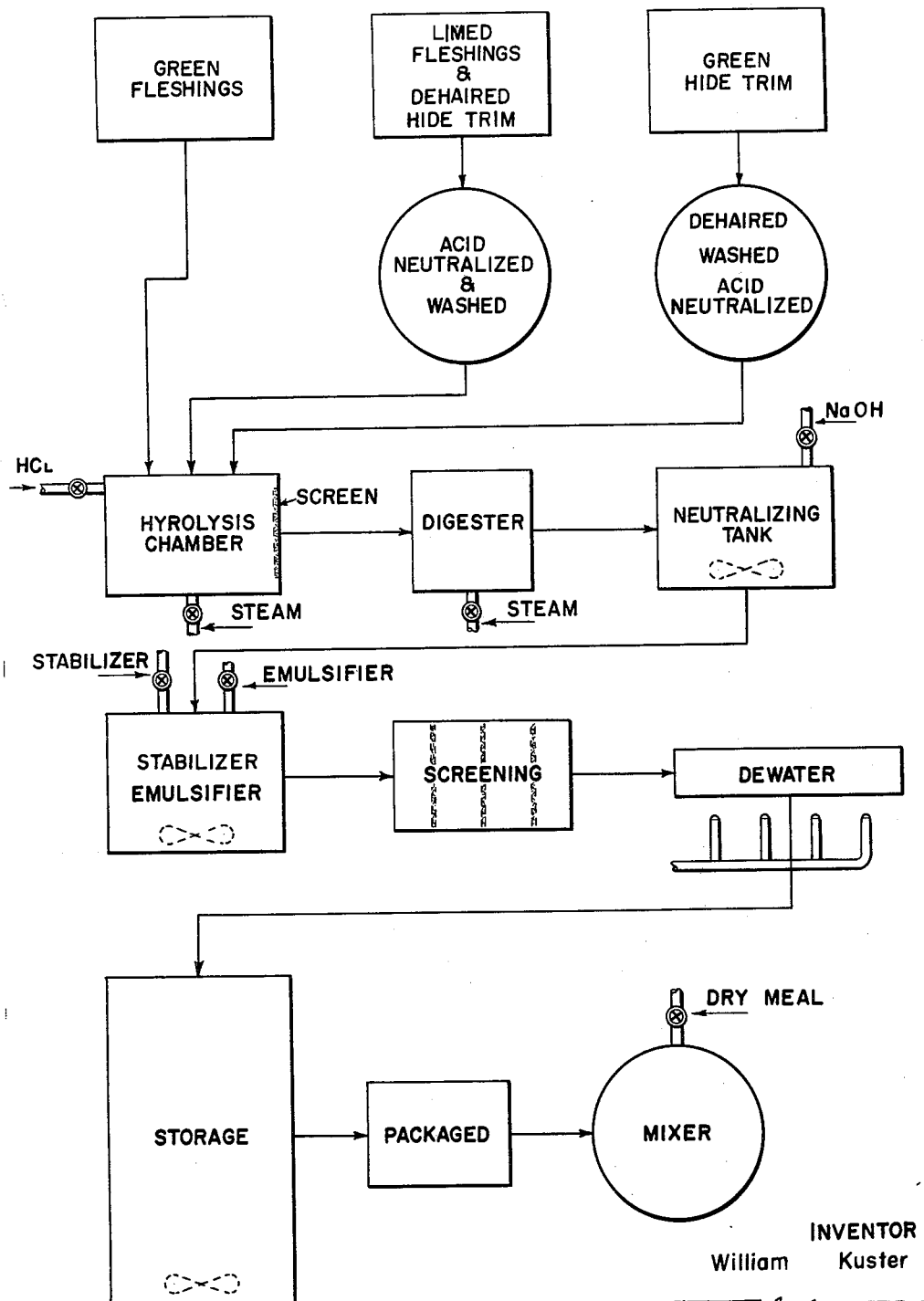

United States Patent Office 3,000,742
Patented Sept. 19, 1961

3,000,742
METHOD OF PRODUCING NUTRITIONAL SUPPLEMENT FROM TANNERY FLESHINGS, HIDE TRIM AND OTHER ANIMAL BY-PRODUCTS AND THE RESULTING PRODUCT
William Kuster, Hillsborough, Calif., assignor to Cal-Tan Research Products Corporation, Napa, Calif., a corporation of California
Filed Feb. 13, 1959, Ser. No. 793,147
22 Claims. (Cl. 99—7)

This invention relates to a new and improved method of producing a nutritional feed supplement rich in protein and fats for addition to animal feeds and produced primarily from tannery fleshings and trim and other raw materials such as poultry viscera and trimmings and to the product produced thereby. Heretofore, tannery by-products such as green fleshings, limed fleshings and green and limed hide trim have been used generally as gluestock or discarded. However, these materials are rich in fat and proteinaceous materials such as the connective tissues and remnants of muscle tissue. The fleshings and trim are of little value in the form in which they are removed from the hide. The present invention comprises a method of converting the material to a digestible form so that it may be mixed with a grain or other feed as a nutritional supplement to feed. It has particular value in poultry feed.

Although the description of the invention which is hereinafter set forth is devoted principally to the treatment of tannery fleshings and hide trim, it will be understood that slaughter house offal, poultry viscera and bone trimmings, may be handled in the same manner either separately or together with tannery fleshings and trim. The term "animal by-products" is sometimes used in this specification and the accompanying claims to include all of the materials separately or together as set forth in this paragraph.

Green hide fleshings consist essentially of the scrapings of soaked hides. The layers of fat and connective tissue, and in some instances muscle tissue, are removed by machine from the underside of the hide.

In common tannery practice, hides are limed and after liming, limed fleshings are removed in a manner similar to green fleshings. However, during the course of the liming process, a portion of the fats have been lost by saponification but free fatty acids and their salts remain. Essentially the glycerin in the fat is lost by the liming process, and the fat in the limed fleshings is predominately in the form of free fatty acids and their salts.

Green hide trim is commonly removed before the hide enters the tanning procedure. It consists of ears and other portions of the hide which are not useful in the production of leather. Hides are also sometimes trimmed after liming. Thus, the hide trim may be either green (unlimed) or limed.

The present invention employs both green and limed fleshings and, desirably, green and limed hide trim. In green fleshings the fats are predominate, whereas in hide trim the protein content is higher. A proper balance between the trim and fleshings balances the fat and protein. Additionally, green fleshings have a very high fat content to the extent that if the fat of green fleshings were emulsified with the protein thereof, the product would be less useful. Thus, a typical ratio is 10% protein to 70% fat which is less desirable. The fat of limed fleshings is considerably lower than green fleshings and the protein is proportionately higher. Thus, in a typical limed fleshing from tanneries, there would be more nearly equal amounts of protein and fat. It will be understood, however, that the percentage of fat and protein in the fleshings and trim varies depending upon the condition of the hide, the type of tanning which is being conducted and the practice of the tannery. Accordingly, percentages of fat and protein set forth herein are subject to wide variation. A desirable balance in accordance with the present invention is 20% to 30% protein, 40% to 60% fat and the remainder ash and moisture. The proportions of protein and fat may vary, but this general range is desirable because it provides good nutrition and also because the ratio set forth is convenient for emulsification. Thus, an important feature of the invention is the provision of a proper balance of raw ingredients to produce a satisfactory end product from the standpoint of nutrition, stability and handling.

The presence of electrolyte in the emulsion tends to make it unstable and hence reduction of the electrolyte content of the finished product is desirable. Various means are employed to maintain a low electrolyte content such as employing lower concentrations of acid and neutralizing agents on the one hand, and more thorough removal (e.g. by washing or leaching) of calcium and other salts present in the fleshings and trim as they enter into the process. A feature of this invention is maintaining stable emulsions of fat and protein in heavy paste form and this is accomplished by reduction of the electrolyte content.

Another feature of this invention is a pre-treatment for all materials except the green fleshings. During the pre-treatment an attempt is made to remove electrolytes as much as possible and generally condition the materials to put them in a state which is suitable for use in conjunction with green fleshings so that a uniform input into the hydrolysis phase of the process is possible. Thus, the acids used in the de-liming step of the process are such as produce soluble salts which are readily removed by washing and leaching. The use of hydrochloric acid is desirable in that the calcium chloride produced is water soluble, whereas, the calcium in the limed fleshings and trim is in a compound which is substantially less soluble. Thus, leaching after acid treatment of the fleshings materially reduces the electrolyte as compared with what could be accomplished by leaching untreated material of the same initial condition.

The fleshings in most tanneries contain sulfides in various forms such as sodium or calcium sulfide. Such materials are toxic and must be removed before the product is added to feed. Further, unless sulfides are thoroughly removed, when the material is fed to fowl, sulfide-like odors and taste are carried over into the eggs. The sulfides are removed in accordance with the present invention partially during the de-liming by the addition of acid. However, thorough removal of the sulfides is accomplished in the hydrolysis step where the fleshings and trim are boiled with acid at a pH in the range of between 1 and 2. The acidity is sufficiently high to remove the salts by forming sodium or calcium chloride and the gaseous hydrogen sulfide is removed due to its higher vapor pressure in relation to that of the boiling liquid in which it occurs.

A further feature of the process is the fact that it is substantially continuous and the hydrolysate is continuously maintained at a pH of about 1 to 3. As hydrolysis progresses through several tanks or compartments the acid is partially used up in reaction with electrolytes and is partially reacted with the protein degradation products, thereby increasing the pH progressively to 3 and possibly even somewhat above 3.

The term "hide wastes" as used herein means hide trim, limed or green, and limed and green fleshings separately, in any combination, and collectively. The term "prepared hide wastes" as used herein means hide wastes in which the limed fleshings and limed hide trim are de-limed, the green hide trim is treated to remove the nutritionally undesirable hair. Sulphides are generally used for this purpose and these sulphides have to be subsequently removed from this material and also from any limed fleshings or trim which may contain these sulphides.

Other objects of the present invention will become apparent upon reading the following specification and referring to the accompanying drawing which is a flow sheet of the process.

As has heretofore been stated, the raw materials with which the present invention is employed consist of green fleshings, limed fleshings, limed hide trim and green hide trim. Preferably the limed fleshings and limed hide trim are handled together. These materials initially have a pH in excess of 9 and as high as 12 or more and accordingly are de-limed in a tank with strong hydrochloric acid or some other suitable acid which neutralizes the lime to form a water soluble salt such as calcium chloride. The acid treatment is continued until the interior of the largest pieces no longer shows red to phenolphthalein which means that the pH has been reduced to approximately 8 and indicates that the calcium hydroxide originally present has now been reduced to a negligible amount and has been almost entirely converted to the very water soluble calcium chloride. This calcium chloride can now be removed by simple water washing. The adequacy of the washing is checked by silver nitrate test. The total chloride content of the wash water is checked so that it is about equal to that of the incoming wash water from the water supply. After this treatment the limed fleshings and trim may have a pH of about 7 or lower in the ambient fluid. The interior of the pieces of hide, fleshing and trim are preferably brought down to a pH lower than 8. This indicates that the calcium hydroxide has reacted with the acid to approach neutrality.

Preliminary pre-treatment of the green trim is separately conducted in the same or a similar vessel (this may be a revolving drum). As a first step the green trim is first agitated with lime and sulphides in order to remove the hair, then in the same vessel the lime and sulphides are removed by acid treatment. Hydrochloric acid and water are added and this results in the formation of water soluble salts and the hydrogen sulfide passes out of the solution as a gas.

Preliminary treatment of green fleshings is not usually required.

Both the green and limed fleshings and trim are deposited continuously or in batches in the hydrolysis chamber and thereafter the process is continuous. The hydrolysate in the chamber is maintained at a pH of between 1 and 2.5 by addition of an acid such as hydrochloric either by automatic metering equipment or manually. Undue quantities of salt are avoided by maintaining as high concentrations of material as possible and as high a pH as possible consistent with good hydrolysis. Live steam is also preferably injected into the hydrolysis chamber to raise the temperature thereof and also to thoroughly agitate the ingredients and insure that the newly introduced unhydrolyzed material is kept submerged and in the dilute acid and is prevented from floating in or adjoining the upper fat layer in the chamber to insure continued hydrolysis. The temperature in the hydrolysis chamber is determined by the boiling point of the mixture in this chamber and normally is slightly above the boiling point of water at atmospheric pressure. This prevents damage to the fats which would occur at higher temperatures and maintains their digestibility, which is very desirable from a nutritional standpoint. A temperature slightly above 212° F. is a minimum, and the maximum temperature should not go above 250° F., if the digestibility of the fat is to be maintained at its optimum. It is possible to hydrolyze at temperatures higher or lower than the boiling point of water at atmospheric pressure. The more concentrated the material entering the hydrolyzing chamber, the higher the permissible temperature and the less concentrated the material, the lower the temperature. Instead of live steam, a steam jacket or steam coil may be employed in the hydrolyzing vessel, then higher concentrations could be employed and a higher temperature would result. During hydrolysis the protein molecules absorb one or more water molecules and this assists in breaking down the complex protein molecules to their degradation products such as polypeptides and in some cases amino acids. Substantially all the remaining hydrogen sulphide boils off during this step. Hydrolysis continues for a period of about ten to twenty minutes, depending upon the condition of the raw material and on the acid concentration. Ultimately, if hydrolysis were continued, the formation of amino acids and finally ammonia would occur. However, a complete destruction is not carried out. The hydrolysis is arrested at approximately the polypeptide stage so that the proteins have become water soluble. It will be understood that the proteins and protein derivatives are not all in a homogeneous state but the term "polypeptide" is intended to cover the average condition of the protein material. The fat, by reason of the heat, has become fluid and hence the resulting mixture of fat and protein derivatives being all in a fluid state is capable of being screened to remove hair and other impurities from the liquified material. In the absence of hydrolysis, it is impractical or impossible to remove the hair and undesirable by-products. It will be understood that other mechanical means of removing impurities other than screening may be employed, such as filtration.

After being screened by a coarse grating located at the discharge of the hydrolysis chamber, the material enters one or more digesters where hydrolysis is continued, live steam being injected into the digester to maintain an elevated temperature and to maintain agitation of the material.

Following the digester treatment, the material is transferred to neutralizing tanks where suitable agitation is maintained by means of a stirrer or injected air. In the neutralizer tanks a reagent such as sodium hydroxide is added to neutralize the acid and form a salt which is not harmful to the end product. The pH is raised to the range of 5 to 6 and preferably about 5.5. Sodium chloride formed by the neutralization of HCl with addition of NaOH is desirable in that it acts as a preservative in the end product. The quantity of moisture is subsequently reduced to a range of 15% to 30% and for this concentration the amount of salt inherently produced serves as a preservative. The salt content is preferably about 16% to 20% depending and based upon the moisture content of the final emulsion product.

In the hydrolyzing step, it has been stated that hydrochloric acid is useful. However, phosphoric acid may be used in the same manner and in the same environment as hydrochloric. Particularly in the case of certain calcium bearing raw materials such as poultry by-products which contain bones, it is desirable to use phosphoric acid as a hydrolyzing medium in order to completely eliminate the possibility of remaining bone splinters. The bones are modified or digested during the hydrolyzing step. The tri-calcium phosphate of the bone is converted into the mono-calcium phosphate or di-calcium phosphate which will pass the fine screen. This screen removes feathers and the very undesirable granite and other rock-like material which is generally present in poultry gizzards, and which is to be thoroughly removed for applications for such end products as dog food. Phosphoric acid has the additional advantage of having nutritional value for the end product. If the phosphoric acid is later neutralized with calcium hydroxide or calcium carbonate, the end product is then a di-calcium phosphate or tri-calcium phosphate which supplies essential nutrients to the ultimate animal feed and has a definite commercial value. A soluble preservative salt such as sodium chloride may be added to the product. Organic acids such as acetic may be useful in hydrolysis. The neutralizing reagent must also be selected from a group such that its salt formed with the hydrolyzing acid is edible and, preferably, nutritious.

Neutralization is preferably effected in the case of hydrochloric acid by the addition of a sodium bearing base, such as sodium hydroxide or possibly sodium carbonate. The resulting sodium chloride is edible and has certain advantages in poultry feed if it is not in excess of ½% of the total feed. However, phosphoric acid salts have a greater food value as substitutes for bone meal which is frequently purchased separately.

The material is then transferred to a stabilizer and emulsifier tank to stabilize the emulsion formed between the protein derivatives in aqueous solution and the liquified fats. It will be understood that the protein derivatives are amphoteric in character. The molecules are hydrophilic and lypophilic and therefore able to attract both the water and the fat molecules to emulsify the material. This is fairly stable, but stabilization is improved by the addition of other edible emulsifying agents such as glycerol monostearate. The fat portion of the emulsion is stabilized to prevent rancidity by such agents as butylated hydroxy toluene and/or butylated hydroxy anisol and/or ethyl or propyl gallate and/or lecithin, and other agents. The fat stabilizing agents mentioned are preferably used in combination with each other because the effect of the use of combination of these agents is to form greater fat stabilities than if any of them were used individually.

It is also important to note that the salt produced by neutralizing the hydrolyzing acid acts as a preservative in the final product, the useful quantity of such salt being partially dependent upon the amount of moisture in the product. The use of hydrochloric acid in the hydrolyzing step and sodium hydroxide in the neutralizing step is thus quite satisfactory.

After neutralization and stabilization, the product is screened by fine screens which normally are 40 to 100 mesh, or it is filtered or impurities are removed by centrifugation or other mechanical means. Thereafter, evaporation is effected. If an open atmospheric pressure evaporator is used, instability of the end product sometimes results in that the fat separates from the proteins because of high temperatures in the range of 240–250° F. and temperatures at the steam coil on the order of 350° F. Hence, it is preferable to use a vacuum evaporator or a vacuum pan where the end temperatures are in the order of 135 to 140 degrees Fahrenheit. The vacuum pan concentrates the material to a desired moisture content in the order of 28% to 30% water although this may be reduced to 15% to 20%, depending on the salt content. The resulting product has the viscosity of apple butter or axle grease. A typical viscosity test of the product in accordance with ASME Power Test Codes shown in Gardner's "Physical and Chemical Examination of Paints, Varnishes, Lacquers and Colors" is as follows:

Viscosity (Stormer, 500 gram weight) at 76° F.
  55 revolutions per minute, equivalent to poises__ 17.1
Viscosity (Stormer, 500 gram weight) at 70° F.
  5 revolutions per minute, equivalent to poises__ 188

Maintaining the product in this condition prevents the breaking away of the fat from the protein in aqueous solutions, and remains stable in high energy feed where large quantities of the end product are mixed with the feed. The stability of the emulsion determines the point of break-away of the fat from the protein fraction which may be influenced by the content of electrolytes in the final mixture, temperature and mechanical agitation such as occur during shipping. Direct radiation of the sun on containers of the material may also lead to separation of the components in the final product.

Stability of the product further depends on a number of factors, such as: (1) the proper breakdown of the protein to a material which is able to combine with fat and water; (2) the electrolyte content being held low by such means as using as dilute an acid as possible to still maintain practical speed of hydrolysis, using a highly ionized acid such as hydrochloric, pre-treatment of the fleshings to a degree of maximum reduction of electrolytes; (3) low temperatures being used for removal of moisture and to prevent not only a modification of the fats but maintaining the emulsion in a more stable form.

After coming from the vacuum pan, the material is at a temperature of 130° to 140° F., and is still in a thick fluid condition. As the product cools, it sets up to a consistency of apple butter. This consistency enables the material to be pumped readily and it can be metered through volumetric meters to determine quantities for batch mixes or even continuous mixes in the feed mills. It is held in a standardization tank where it cools and where it can be analyzed and reblended with other materials in order to meet the standards of the finished products. From this tank the material is pumped to final storage from which shipments are made to mills for incorporation of the product into grain and oil cake ground mixtures in order to produce either high energy or polished animal feeds.

When mixed with grain, the material is more or less extruded by pumps through a pipe in a sausage-like form into the mixer. This is an improvement over the adding of fats to feed in liquid form (as generally practiced heretofore) where the fats have to be heated to fairly high temperatures and then sprayed under pressure onto the feed while the mixer is running, with consequent lumping. However, when fed in the form of paste, as in accordance with this invention, the material does not run into the feed but rolls in the mixture with the feed and is gradually absorbed by rubbing on the particles of feed. This method of mixing prevents lumping. Further, the need of expensive heating equipment such as boilers and spray equipment and the expense of operation to incorporate heated fats into the feed is avoided. Better distribution through the feed is also accomplished, and the fat is not deteriorated by subjection to continued heating.

The end product is mixed with ground grain, such as milo, barley, corn and oil cakes such as soy bean oil or cottonseed oil cake meal. A conventional feed is a mixture of ground grain and oil cake, usually blended with minerals and vitamins and usually fish meal and meat and bone scrap meal is a rather powdery mixture which raises a great deal of dust and is disagreeable to handle. By contrast a polished feed treated with the material of the present invention requires only that about 1% to 3% of the material be added. This depresses the dust in the mill and reduces handling problems. It has also been found that the dust suppressing effect of the emulsion is considerably greater pound for pound than that of fat bearing materials heretofore employed.

It will be understood that other animal by-products as previously defined may be hydrolyzed, neutralized, emulsified and dewatered as described and added to grain, cake or other vegetable material in substantially the same manner.

"Hydrolyzing" as used in the claims means acid hydrolysis in the presence of elevated temperature.

Although the foregoing invention has been desired in some detail, it is understood that certain changes and modifications may be practiced within the spirit of the invention and scope of the appended claims.

I claim:

1. A method of producing a food supplement rich in protein and fats for addition to animal feed comprising, neutralizing animal by-products, hydrolyzing said animal by-products by treating with a hydrolyzing acid at atmospheric pressure and at an elevated temperature under 300° F. until the protein content reaches the polypeptide state of hydrolysis and the fat is liquified, separating mechanically the foreign residual matter from the protein and fat, neutralizing the hydrolyzed mixture, forming an emulsion of the protein and fat, and removing water from the emulsion to form a paste.

2. A method according to claim 1 in which said hydrolyzing acid is of the group whose salts are edible.

3. A method according to claim 1 in which said hydrolyzing acid is of the group consisting of hydrochloric, phosphoric and acetic acids.

4. A method according to claim 1 in which said hydrolyzing temperature is over the boiling point of water at atmospheric pressure.

5. A method according to claim 1 in which said hydrolyzing temperature is over the boiling point of water at atmospheric pressure and under 235° F.

6. A method according to claim 1 in which a stabilizing agent is added chosen from the group consisting of butylated hydroxy toluene, butylated hydroxy anisol, ethyl and propyl gallate, and lecithin.

7. A method according to claim 1 in which said paste has a viscosity of about 17.1 poises at 76° F. and 188 poises at 70° F.

8. A method of producing an edible food supplement comprising providing green fleshings, limed fleshings and hide trim, de-liming the limed fleshings by neutralizing the lime with acid and washing out the soluble salts, preparing hide trim by washing out the sulphides and hair and then boiling with acid to drive out additional sulphides, hydrolyzing a mixture of green fleshings, delimed limed fleshings and prepared hide trim by adding an acid in a quantity sufficient to reduce the pH to about 1 to 2 at atmospheric pressure and at a temperature above the boiling point of water at atmospheric pressure and below 300° F. for a period of time to reduce the protein ingredients to about the polypeptide state of hydrolysis and to solubilize the protein content and liquify the fat, screen the liquid mixture, neutralizing the mixture to the range of pH 5 to 6, stabilizing and emulsifying the neutralized material, and reducing the water content of the emulsion to obtain a consistency between that of axle grease and apple butter.

9. A method of producing a food supplement comprising providing prepared hide wastes, acid hydrolyzing the prepared hide wastes at atmospheric pressure until the protein content is hydrolyzed to about the polypeptide state of hydrolysis and the fat is liquified, neutralizing the hydrolyzed prepared hide wastes, and removing a portion of the water to form a paste and which is characterized by the low electrolyte content of the paste and a consistency approximating 17 poises at 76° F.

10. A method of producing a food supplement comprising providing prepared hide wastes, acid hydrolyzing the prepared hide wastes at atmospheric pressure until the protein content is hydrolyzed to about the polypeptide state of hydrolysis and the fat is liquified, neutralizing the hydrolyzed prepared hide wastes, and removing a portion of the water to form a paste, the acid employed in said hydrolyzing and the base employed in said neutralizing combining to form a salt capable of preserving said paste without addition of additional salts for the amount of water in the paste.

11. A method according to claim 10 and wherein the salt content is about 16% to 20% relative to total moisture content of the final product.

12. A method of producing a food supplement comprising providing prepared hide wastes, acid hydrolyzing the prepared hide wastes at atmospheric pressure until the protein content is hydrolyzed to about the polypeptide state of hydrolysis and the fat is liquified, neutralizing the hydrolyzed prepared hide wastes, and removing a portion of the water to form a paste, the acid employed in hydrolyzing being of a type whose salt is edible and which serves as a preservative for the paste.

13. A method of producing a food supplement comprising providing prepared hide wastes, acid hydrolyzing the prepared hide wastes at atmospheric pressure until the protein content is hydrolyzed to about the polypeptide state of hydrolysis and the fat is liquified and capable of being mechanically purified of hair and waste materials, neutralizing the hydrolyzed prepared hide wastes, mechanically separating the hair and waste materials from the fat and protein, and removing a portion of the water to form a paste and which is characterized by the low electrolyte content of the paste and a consistency approximating 17 poises at 76° F.

14. A product produced in accordance with claim 1.

15. A product produced in accordance with claim 8.

16. A continuous method of producing a feed supplement which is rich in protein and fat for addition to animal feed comprising, neutralizing animal by-products, continuously hydrolyzing said animal by-products by treating with a hydrolyzing acid at an elevated temperature and under 300° F. until the protein content is reduced to about the polypeptide state of hydrolysis and the fat is liquified, continuously adding neutralized animal by-products to the hydrolysate while continuously removing the hydrolyzed animal by-products, continuously separating mechanically the foreign residual matter from the soluble protein and liquified fat, forming an emulsion of the fat and protein, and then removing water from the emulsion to form a paste.

17. A method of producing a feed supplement rich in protein and fat for addition to animal feed comprising, neutralizing animal by-products containing bone, hydrolyzing said animal by-products by treating with a phosphoric acid at an elevated temperature until the protein content is reduced to about the polypeptide state of hydrolysis, the fat is liquified, and the bone is digested, neutralizing the hydrolyzed animal by-product, then mechanically separating the hair and other waste materials from the liquid mixture, and then reducing the moisture content thereof to form a paste.

18. A method of producing a feed supplement rich in protein and fat for addition to animal feed comprising, hydrolyzing animal by-products containing bone by treating with a phosphoric acid at an elevated temperature until the protein content is reduced to about the polypeptide state of hydrolysis, the fat is liquified, and the bone is digested, neutralizing the hydrolyzed animal by-product, then mechanically separating the hair and other waste materials from the liquid mixture, and then reducing the moisture content thereof to form a paste.

19. A method of producing composite animal feed of improved nutritive value comprising: producing an animal feed supplement paste by neutralizing animal by-products, hydrolyzing said animal by-products by treating with a hydrolyzing acid at atmospheric pressure and at an elevated temperature under 300° F. until the protein content is reduced to about the polypeptide state of hydrolysis and the fat is liquified, separating mechanically the solid residual material from the protein and fat, neutralizing the hydrolyzed mixture, forming an emulsion of the protein and fat, and removing water from the emulsion to form a paste, introducing said separated paste into a measured quantity of dry animal feed grain, combining said paste and grain at room temperature by causing said paste to be contacted with said grain by agitation of said paste and grain, and continuing agitation until said paste is thoroughly distributed throughout said grain.

20. A product produced in accordance with the method of claim 19.

21. A method of producing an animal feed composed of a dry grain material and a feed supplement by thoroughly mixing the dry grain product with the feed supplement without the use of additive heat and without lumping of the dry grain material, said feed supplement being prepared by acid hydrolyzing prepared hide wastes until the protein content is reduced to about the polypeptide state of hydrolysis and the fat is liquified, neutralizing the hydrolyzed prepared hide wastes, and removing a portion of the water to form a paste, said method comprising adding the feed supplement to the dry grain material while mixing the dry material and while the feed supplement is in the form of a paste emulsion having a consistency like that of apple butter to axle grease, and a water content of between about 10% to about 30%.

22. A feed product for poultry made in accordance with the process of claim 21.

References Cited in the file of this patent

UNITED STATES PATENTS

| | | |
|---|---|---|
| 1,071,218 | Dyck | Aug. 26, 1913 |
| 2,137,365 | Strong et al. | Nov. 22, 1938 |
| 2,589,287 | Ryan et al. | Mar. 18, 1952 |
| 2,683,694 | Hoffman et al. | July 13, 1954 |
| 2,690,396 | Chenicek et al. | Sept. 28, 1954 |
| 2,806,790 | Bedford | Sept. 17, 1957 |